(No Model.)
J. L. WILDEMORE.
PINCH DOG.
No. 426,893. Patented Apr. 29, 1890.
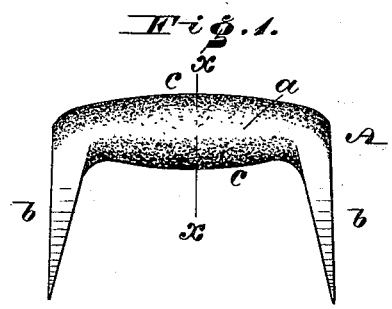
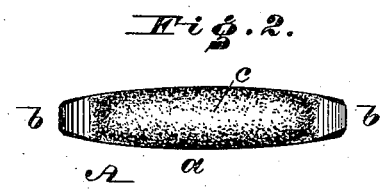
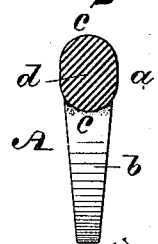
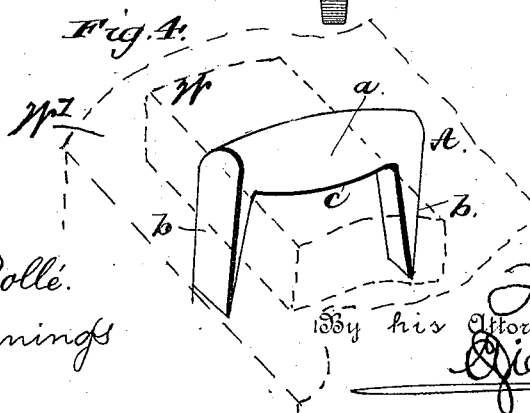
Witnesses
Theo Rollé.
A. P. Jennings
Inventor
Jacob L. Wildemore
By his Attorneys

UNITED STATES PATENT OFFICE.

JACOB L. WILDEMORE, OF PHILADELPHIA, PENNSYLVANIA.

PINCH-DOG.

SPECIFICATION forming part of Letters Patent No. 426,893, dated April 29, 1890.

Application filed January 17, 1889. Serial No. 296,662. (No model.)

*To all whom it may concern:*

Be it known that I, JACOB L. WILDEMORE, a citizen of the United States, residing in the city and county of Philadelphia, State of Pennsylvania, have invented a new and useful Improvement in Pinch-Dogs for Wood-Workers, which improvement is fully set forth in the following specification and accompanying drawings.

My invention relates to improvements in pinch-dogs for wood-workers; and it consists in a device constructed as hereinafter set forth and claimed.

The dog is strong and durable and well adapted to endure the rough usage to which it is subjected.

Figure 1 represents a side elevation of a pinch-dog embodying my invention. Fig. 2 represents a top view thereof. Fig. 3 represents a section on line $x\, x$, Fig. 1. Fig. 4 represents a perspective view showing the dog in position.

Similar letters of reference indicate corresponding parts in the several figures.

Referring to the drawings, A designates a pinch-dog consisting of the head $a$ and legs $b$, the latter being pointed or sharpened. It will be noticed that the inner surfaces of the legs $b$ are inclined, as shown, for the purpose of making it easier to drive the same into the place of securement, and also to produce a clamping effect on the parts with which the dog is used by drawing the said parts together, as will be understood. The head is swelled, as at $c\, c$, so as to be somewhat elliptical in cross-section, as $d$, the upper and lower edges of the section being circular and the sides having a straight-line portion, it being seen that the top swell receives the blows imparted to the dog while driving the same into the wood, and the swells are of the form of reversed arches.

The device set forth is adapted for holding pieces of wood or other material, when glued, until dried, or while upon a lathe, and for other purposes.

When it is desired to groove or otherwise cut two or more pieces of material on a lathe, they may be connected by the dog and held by the chucks, and a uniformity of configuration will be more readily attained. This is especially true where small pieces of material are used. In Fig. 4 the piece of material W is shown held against the piece W' while said pieces have been glued and are drying.

The circular form presents a strong structure, especially where the dog is subjected to great strain and rough usage.

In practice the dog is formed of cast-steel and afterward finished, and having the legs pointed or sharpened.

I am aware that it is not new to construct a pinch-dog having a head with rounded upper and lower faces; but I am not aware that it is common to construct a pinch-dog as herein described and claimed, whereby the said head is enlarged toward the center thereof, so that a central vertical section lengthwise thereof presents convex upper and lower edges, and cross-sections present semicircular upper and lower edges and straight-line connecting sides.

Having thus described my invention, what I claim as new, and desire to secure by Letters Patent, is—

1. A pinch-dog for wood-workers, consisting of a head enlarged at the center thereof, and having in vertical longitudinal section convex upper and lower edges and sharpened legs, substantially as and for the purpose set forth.

2. A pinch-dog for wood-workers, having a head enlarged at the center thereof, and having in vertical longitudinal section convex upper and lower edges, and in cross-section having semicircular upper and lower edges and straight-line connecting sides, substantially as and for the purpose set forth.

JACOB L. WILDEMORE.

Witnesses:
JOHN A. WIEDERSHEIM,
A. P. JENNINGS.